US012759110B2

(12) United States Patent
Sorenson et al.

(10) Patent No.: US 12,759,110 B2
(45) Date of Patent: Oct. 13, 2026

(54) ABRASIVE ARTICLE AND METHOD OF MAKING THE SAME

(71) Applicant: 3M INNOVATIVE PROPERTIES COMPANY, St. Paul, MN (US)

(72) Inventors: Gregory P. Sorenson, Maplewood, MN (US); Ilya Gorodisher, Stillwater, MN (US); Ernest L. Thurber, Somerset, WI (US); Thomas J. Nelson, Woodbury, MN (US)

(73) Assignee: 3M INNOVATIVE PROPERTIES COMPANY, St. Paul, MN (US)

( * ) Notice: Subject to any disclaimer, the term of this patent is extended or adjusted under 35 U.S.C. 154(b) by 481 days.

(21) Appl. No.: 18/029,537

(22) PCT Filed: Oct. 7, 2021

(86) PCT No.: PCT/IB2021/059205

§ 371 (c)(1),
(2) Date: Mar. 30, 2023

(87) PCT Pub. No.: WO2022/074601

PCT Pub. Date: Apr. 14, 2022

(65) Prior Publication Data

US 2023/0356361 A1 Nov. 9, 2023

Related U.S. Application Data

(60) Provisional application No. 63/089,651, filed on Oct. 9, 2020.

(51) Int. Cl.
*B24D 3/28* (2006.01)
*B24D 18/00* (2006.01)
(Continued)

(52) U.S. Cl.
CPC ........... *B24D 3/28* (2013.01); *B24D 18/0072* (2013.01); *C09D 7/61* (2018.01); *C09D 161/06* (2013.01); *C09K 3/1409* (2013.01)

(58) Field of Classification Search
CPC ...... B24D 18/0072; B24D 3/28; B24D 3/344; B24D 11/005; B24D 3/002; B24D 3/007;
(Continued)

(56) References Cited

U.S. PATENT DOCUMENTS

| | | | |
|---|---|---|---|
| 458,417 | A | 8/1891 | Eldredge |
| 1,615,231 | A | 1/1927 | Power |

(Continued)

FOREIGN PATENT DOCUMENTS

| | | | |
|---|---|---|---|
| CA | 786284 | A | 5/1968 |
| EP | 226097 | B1 | 5/1990 |

(Continued)

OTHER PUBLICATIONS

"Phenolic Resins", Kirk-Othmer, Encyclopedia Of Chemical Technology, Fourth Edition, John Wiley and Sons, 1996, vol. 18, pp. 603-644.

(Continued)

*Primary Examiner* — Amber R Orlando
*Assistant Examiner* — Ryan Patrick Loughran
(74) *Attorney, Agent, or Firm* — Martha J. Engel

(57) ABSTRACT

An abrasive article comprises abrasive particles adhered to a substrate by a binder material. The binder material comprises an at least partially cured resole phenolic resin and an organic polymeric rheology modifier. The amount of the at least partially cured resole phenolic resin comprises 99.01 to 99.98 weight percent of the combined weight of the at least partially cured resole phenolic resin and the organic polymeric rheology modifier. Methods of making the abrasive article are also disclosed.

18 Claims, 1 Drawing Sheet

(51) Int. Cl.

| | |
|---|---|
| ***C09D 7/61*** | (2018.01) |
| ***C09D 161/06*** | (2006.01) |
| ***C09K 3/14*** | (2006.01) |

(58) Field of Classification Search

CPC ...... B24D 11/001; B24D 3/285; B24D 11/00; B24D 3/00; B24D 11/02; B24D 13/00; B24D 18/00; B24D 3/14; C09K 3/1409; C09D 161/06; C09D 7/61; C09D 161/24; C09D 167/02; C09D 161/14; C08G 63/6884; C08G 63/6886; C08G 8/28; C08J 2467/02; C08J 7/0427; C08J 7/043; C08L 61/24; C08L 67/00; C08L 67/02; C08L 67/03; C08L 2666/16; C08L 2666/18

See application file for complete search history.

(56) References Cited

U.S. PATENT DOCUMENTS

| | | | |
|---|---|---|---|
| 1,822,596 | A | 9/1931 | Leather |
| 1,910,444 | A | 5/1933 | Nicholson |
| 2,173,796 | A | 9/1939 | Oglesby |
| 2,281,558 | A | 5/1942 | Cross |
| 2,534,805 | A | 12/1950 | Waterfield |
| 2,958,593 | A | 11/1960 | Hoover et al. |
| 3,041,156 | A | 6/1962 | Rowse et al. |
| 3,795,496 | A | 3/1974 | Greenwood |
| 3,843,576 | A | 10/1974 | Parkinson |
| 3,931,448 | A | 1/1976 | Parkinson |
| 4,227,350 | A | 10/1980 | Fitzer |
| 4,268,641 | A | 5/1981 | Koenig et al. |
| 4,314,827 | A | 2/1982 | Leitheiser et al. |
| 4,384,096 | A | 5/1983 | Sonnabend |
| 4,588,419 | A | 5/1986 | Caul et al. |
| 4,623,364 | A | 11/1986 | Cottringer et al. |
| 4,652,275 | A | 3/1987 | Bloecher et al. |
| 4,734,104 | A | 3/1988 | Broberg |
| 4,737,163 | A | 4/1988 | Larkey |
| 4,744,802 | A | 5/1988 | Schwabel |
| 4,751,138 | A | 6/1988 | Tumey et al. |
| 4,770,671 | A | 9/1988 | Monroe et al. |
| 4,799,939 | A | 1/1989 | Bloecher et al. |
| 4,881,951 | A | 11/1989 | Wood et al. |
| 4,927,431 | A | 5/1990 | Buchanan et al. |
| 4,991,362 | A | 2/1991 | Heyer et al. |
| 4,997,461 | A | 3/1991 | Markhoff-Matheny et al. |
| 5,009,675 | A | 4/1991 | Kunz et al. |
| 5,011,508 | A | 4/1991 | Wald et al. |
| 5,042,991 | A | 8/1991 | Kunz et al. |
| 5,085,671 | A | 2/1992 | Martin et al. |
| 5,152,917 | A | 10/1992 | Pieper et al. |
| 5,201,916 | A | 4/1993 | Berg et al. |
| 5,203,884 | A | 4/1993 | Buchanan et al. |
| 5,210,982 | A | 5/1993 | Kormanek et al. |
| 5,213,591 | A | 5/1993 | Celikkaya et al. |
| 5,334,630 | A | 8/1994 | Francis et al. |
| 5,352,254 | A | 10/1994 | Celikkaya |
| 5,366,523 | A | 11/1994 | Rowenhorst et al. |
| 5,378,251 | A | 1/1995 | Culler et al. |
| 5,435,816 | A | 7/1995 | Spurgeon et al. |
| 5,436,063 | A | 7/1995 | Follett et al. |
| 5,496,386 | A | 3/1996 | Broberg et al. |
| 5,520,711 | A | 5/1996 | Helmin |
| 5,591,239 | A | 1/1997 | Larson et al. |
| 5,609,706 | A | 3/1997 | Benedict et al. |
| RE35,570 | E | 7/1997 | Rowenhorst et al. |
| 5,672,097 | A | 9/1997 | Hoopman |
| 5,681,361 | A | 10/1997 | Sanders, Jr. |
| 5,712,210 | A | 1/1998 | Windisch et al. |
| 5,858,140 | A | 1/1999 | Berger et al. |
| 5,874,495 | A | 2/1999 | Robinson |
| 5,928,070 | A | 7/1999 | Lux |
| 5,946,991 | A | 9/1999 | Hoopman |
| 5,961,674 | A | 10/1999 | Gagliardi et al. |
| 5,975,987 | A | 11/1999 | Hoopman et al. |
| 5,975,988 | A | 11/1999 | Christianson |
| 5,984,988 | A | 11/1999 | Berg et al. |
| 6,017,831 | A | 1/2000 | Beardsley et al. |
| 6,129,540 | A | 10/2000 | Hoopman et al. |
| 6,843,815 | B1 | 1/2005 | Thurber et al. |
| 7,741,402 | B2 | 6/2010 | Bobsein et al. |
| 8,034,137 | B2 | 10/2011 | Erickson et al. |
| 8,142,531 | B2 | 3/2012 | Adefris et al. |
| 8,142,532 | B2 | 3/2012 | Erickson et al. |
| 8,142,891 | B2 | 3/2012 | Culler et al. |
| 8,779,055 | B2 | 7/2014 | Rabasco et al. |
| 9,631,165 | B2 | 4/2017 | Droege et al. |
| 2008/0207833 | A1 * | 8/2008 | Bear ........................ C08L 67/00 525/190 |
| 2009/0165394 | A1 | 7/2009 | Culler et al. |
| 2009/0169816 | A1 | 7/2009 | Erickson et al. |
| 2009/0181260 | A1 | 7/2009 | Verma et al. |
| 2010/0107509 | A1 | 5/2010 | Guiselin |
| 2012/0227333 | A1 | 9/2012 | Adefris et al. |
| 2013/0040537 | A1 | 2/2013 | Schwabel et al. |
| 2013/0125477 | A1 | 5/2013 | Adefris |
| 2016/0151982 | A1 | 6/2016 | Sand |
| 2017/0129075 | A1 | 5/2017 | Thurber et al. |
| 2017/0130072 | A1 | 5/2017 | Mcculloch et al. |
| 2017/0198238 | A1 | 7/2017 | Kensicher et al. |
| 2017/0225300 | A1 * | 8/2017 | Beveridge .......... B24D 18/0027 |
| 2017/0252898 | A1 | 9/2017 | Schillo-Armstrong et al. |
| 2018/0320038 | A1 | 11/2018 | Hill et al. |

FOREIGN PATENT DOCUMENTS

| | | | | |
|---|---|---|---|---|
| EP | 0426138 | B2 | 8/1999 | |
| EP | 705852 | B1 | 9/2010 | |
| RU | 1155436 | A1 | 5/1985 | |
| WO | 2002032626 | A1 | 4/2002 | |
| WO | WO-0232626 | A1 * | 4/2002 | ............. B24D 11/02 |
| WO | 2010002493 | A1 | 1/2010 | |
| WO | 2012125995 | A1 | 9/2012 | |
| WO | 2016064726 | A1 | 4/2016 | |
| WO | 2018106587 | A1 | 6/2018 | |
| WO | 2020128787 | A1 | 6/2020 | |
| WO | 2020212779 | A1 | 10/2020 | |
| WO | 2021161129 | A1 | 8/2021 | |

OTHER PUBLICATIONS

International Search Report for PCT International Application No. PCT/IB2021/057652, mailed on Nov. 18, 2021, 5 pages.

International Search report for PCT International Application No. PCT/IB2021/059205, mailed on Jan. 14, 2022, 4 pages.

Product information from FACI Group (date unknown but believed to be prior to the date of the filing of the present application), 20 Pages.

Product information from ROHM and HAAS, "ACUSOL TM Rheology Modifiers for Home and Fabric Care Products"; May 2008, 20 Pages.

Product information from ROHM and HAAS, "ACUSOL™ 835 ASE Rheology Modifier and Suspension Stabilizer for Particulates/ Oils in Cleaners and Detergents", Aug. 2008, 2 Pages.

* cited by examiner

ABRASIVE ARTICLE AND METHOD OF MAKING THE SAME

TECHNICAL FIELD

The present disclosure relates to abrasive articles including a phenolic binder material and abrasive particles, and methods of making the same.

BACKGROUND

Abrasive articles generally comprise abrasive particles (also known as "grains") retained within a binder. During manufacture of various types of abrasive articles, the abrasive particles are deposited on a binder material precursor in an oriented manner (e.g., by electrostatic coating or by some mechanical placement technique). Typically, the most desirable orientation of the abrasive particles is substantially perpendicular to the surface of the backing.

In the case of nonwoven abrasive articles, the binder material precursor is coated on a lofty open nonwoven fiber web, the abrasive particles are adhered to the binder material precursor, and then the binder material precursor is cured sufficiently to retain the abrasive particles during use.

In the case of certain coated abrasive articles (e.g., grinding discs), the backing is a relatively dense planar substrate (e.g., vulcanized fiber or a woven or knit fabric, optionally treated with a saturant to increase durability). A make layer precursor (or make coat) containing a first binder material precursor is applied to the backing, and then the abrasive particles are partially embedded into the make layer precursor. Frequently, the abrasive particles are embedded in the make layer precursor with a degree of orientation; e.g., by electrostatic coating or by a mechanical placement technique. The make layer precursor is then at least partially cured in order to retain the abrasive particles when a size layer precursor (or size coat) containing a second binder material precursor is overlaid on the at least partially cured make layer precursor and abrasive particles. Next, the size layer precursor, and the make layer precursor if not sufficiently cured, are cured to form the coated abrasive article.

For both of the above types of abrasive articles, it is generally desirable that the abrasive particles remain in their original orientation as embedded in the binder material precursor until it has been sufficiently cured to fix them in place. This is especially troublesome when the binder precursor material is too fluid so that the particles tip over by gravity, or if the binder precursor material is too hard such that the particles do not adhere to the binder precursor material and again tip over due to gravity.

Abrasive particle tipping after deposition is especially problematic with resole phenolic resin binder material precursors. It would be desirable to have resole-phenolic-resin-based binder material precursors that the original orientation of the applied abrasive particles is maintained until sufficient curing has occurred.

SUMMARY

The present disclosure overcomes this problem by using a resole phenolic-based curable composition (typically thixotropic) suitable for use in manufacture of an abrasive article. The curable composition comprises a liquid phenolic resin and an organic polymeric rheology modifier comprising an alkali-swellable/soluble polymer. These organic polymeric rheology modifiers are presently discovered to provide better control of abrasive tip density across all mineral coating technologies which can yield abrasives with equal or better performance at lower precision shaped grain loadings than existing commercial products.

Organic polymeric rheology modifiers are known to give pseudoplastic flow characteristics. Particularly, Alkali-Swellable/soluble Emulsion (ASE) polymers, Hydrophobically-modified Alkali-Swellable/soluble Emulsion (HASE) polymers, and Hydrophobically-modified Ethoxylated URethane (HEUR) polymers have been used in aqueous compositions for latex paints, personal care products, and drilling muds. In a first aspect, the present disclosure provides a method of making an abrasive article comprising:

- disposing a curable composition on a substrate, wherein the curable composition comprises a resole phenolic resin and an organic polymeric rheology modifier, wherein the organic polymeric rheology modifier comprises an alkali-swellable/soluble polymer, and wherein the amount of resole phenolic resin comprises 99.01 to 99.98 weight percent of the combined weight of the resole phenolic resin and the organic polymeric rheology modifier;
- adhering abrasive particles to the curable composition; and
- at least partially curing the curable composition.

In a second aspect, the present disclosure provides an abrasive article comprising abrasive particles adhered to a substrate by a binder material comprising an at least partially cured resole phenolic resin and an organic polymeric rheology modifier, wherein the amount of resole phenolic resin comprises 99.01 to 99.98 weight percent of the combined weight of the resole phenolic resin and the organic polymeric rheology modifier.

As used herein:

- "alkali-swellable" means at least partially swellable in an aqueous solution of a water-soluble base having a pH of greater than 7;
- "alkali-swellable/soluble" means at least one of alkali-swellable or alkali-soluble (i.e., alkali-swellable and/or alkali-soluble); and
- "polymer" refers to an organic polymer unless otherwise clearly indicated.

Features and advantages of the present disclosure will be further understood upon consideration of the detailed description as well as the appended claims.

Figure 1:
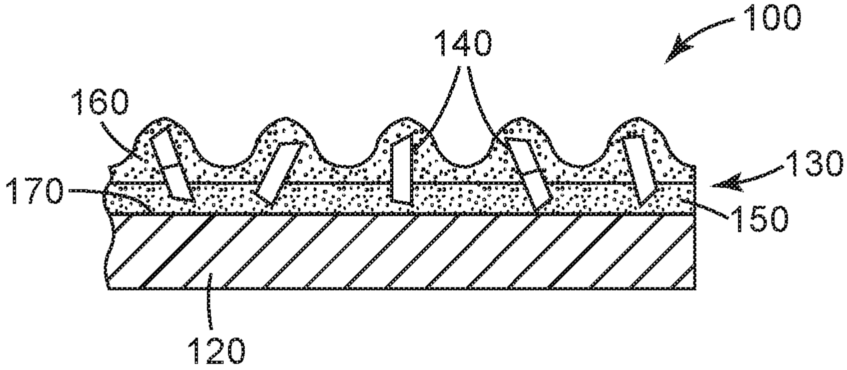
FIG. 1 is a cross-sectional side view of an exemplary coated abrasive article 100 according to the present disclosure.

Repeated use of reference characters in the specification and drawings is intended to represent the same or analogous features or elements of the disclosure. It should be understood that numerous other modifications and embodiments can be devised by those skilled in the art, which fall within the scope and spirit of the principles of the disclosure. The figures may not be drawn to scale.

DETAILED DESCRIPTION

An exemplary embodiment of a coated abrasive article according to the present disclosure is depicted in FIG. 1. Referring now to FIG. 1, coated abrasive article 100 has backing 120 and abrasive layer 130. Abrasive layer 130 includes abrasive particles 140 secured to major surface 170 of backing 120 (substrate) by make layer 150 and size layer 160.

Coated abrasive articles according to the present disclosure may include additional layers such as, for example, an optional supersize layer that is superimposed on the abrasive layer, or a backing antistatic treatment layer may also be included, if desired.

Useful backings include, for example, those known in the art for making coated abrasive articles. Typically, the backing has two opposed major surfaces, although this is not a requirement. The thickness of the backing generally ranges from about 0.02 to about 5 millimeters, desirably from about 0.05 to about 2.5 millimeters, and more desirably from about 0.1 to about 1.0 millimeter, although thicknesses outside of these ranges may also be useful. Generally, the strength of the backing should be sufficient to resist tearing or other damage during abrading processes. The thickness and smoothness of the backing should also be suitable to provide the desired thickness and smoothness of the coated abrasive article; for example, depending on the intended application or use of the coated abrasive article.

Exemplary backings include: dense nonwoven fabrics (e.g., needletacked, meltspun, spunbonded, hydroentangled, or meltblown nonwoven fabrics), knitted fabrics, stitch-bonded and/or woven fabrics; scrims; polymer films; treated versions thereof; and combinations of two or more of these materials.

Fabric backings can be made from any known fibers, whether natural, synthetic or a blend of natural and synthetic fibers. Examples of useful fiber materials include fibers or yarns comprising polyester (for example, polyethylene terephthalate), polyamide (for example, hexamethylene adipamide, polycaprolactam), polypropylene, acrylic (formed from a polymer of acrylonitrile), cellulose acetate, polyvinylidene chloride-vinyl chloride copolymers, vinyl chloride-acrylonitrile copolymers, graphite, polyimide, silk, cotton, linen, jute, hemp, or rayon. Useful fibers may be of virgin materials or of recycled or waste materials reclaimed from garment cuttings, carpet manufacturing, fiber manufacturing, or textile processing, for example. Useful fibers may be homogenous or a composite such as a bicomponent fiber (for example, a co-spun sheath-core fiber). The fibers may be tensilized and crimped, but may also be continuous filaments such as those formed by an extrusion process.

The backing may have any suitable basis weight; typically, in a range of from 100 to 1250 grams per square meter (gsm), more typically 450 to 600 gsm, and even more typically 450 to 575 gsm. In many embodiments (e.g., abrasive belts and sheets), the backing typically has good flexibility; however, this is not a requirement (e.g., vulcanized fiber discs). To promote adhesion of binder resins to the backing, one or more surfaces of the backing may be modified by known methods including corona discharge, ultraviolet light exposure, electron beam exposure, flame discharge, and/or scuffing.

The make layer is formed by at least partially curing a make layer precursor that is a curable composition according to the present disclosure. The curable composition comprises a resole phenolic resin and an organic polymeric rheology modifier that aids in preserving the initial placement and orientation of the abrasive particles during manufacture.

Phenolic resins are generally formed by condensation of phenol and formaldehyde, and are usually categorized as resole or novolac phenolic resins. Novolac phenolic resins are acid-catalyzed and have a molar ratio of formaldehyde to phenol of less than 1:1. Resole (also resol) phenolic resins can be catalyzed by alkaline catalysts, and the molar ratio of formaldehyde to phenol is greater than or equal to one, typically between 1.0 and 3.0, thus presenting pendant methylol groups. Alkaline catalysts suitable for catalyzing the reaction between aldehyde and phenolic components of resole phenolic resins include sodium hydroxide, barium hydroxide, potassium hydroxide, calcium hydroxide, organic amines, and sodium carbonate, all as solutions of the catalyst dissolved in water.

Resole phenolic resins are typically coated as a solution with water and/or organic solvent (e.g., alcohol). Typically, the solution includes about 70 percent to about 85 percent solids by weight, although other concentrations may be used. If the solids content is very low, then more energy is required to remove the water and/or solvent. If the solids content is very high, then the viscosity of the resulting phenolic resin is too high which typically leads to processing problems.

Phenolic resins are well-known and readily available from commercial sources. Examples of commercially available resole phenolic resins useful in practice of the present disclosure include those marketed by Durez Corporation under the trade designation VARCUM (e.g., 29217, 29306, 29318, 29338, 29353); those marketed by Ashland Chemical Co. of Bartow, Florida under the trade designation AEROFENE (e.g., AEROFENE 295); and those marketed by Kangnam Chemical Company Ltd. of Seoul, South Korea under the trade designation PHENOLITE (e.g., PHENOLITE TD-2207).

A general discussion of phenolic resins and their manufacture is given in Kirk-Othmer, *Encyclopedia of Chemical Technology,* 4th Ed., John Wiley & Sons, 1996, New York, Vol. 18, pp. 603-644.

In addition to the resole phenolic resin, the curable composition contains an organic polymeric rheology modifier that comprises an alkali-swellable/soluble polymer. The curable composition comprises a resole phenolic resin (typically diluted with water) and an organic polymeric rheology modifier that comprises an alkali-swellable/soluble polymer. On a solids basis, wherein the amount of the resole phenolic resin comprises 99.01 to 99.98 weight percent (preferably 99.2 to 99.95 weight percent, more preferably 99.3 to 99.95 weight percent, more preferably 99.35 to 99.95, and even more preferably 99.35 to 99.9 weight percent) based on the combined weight of the resole phenolic resin and the organic polymeric rheology modifier. Accordingly, the curable composition contains from 0.02 to 0.99 weight percent, preferably 0.02 to 0.70 weight percent, and more preferably 0.02 to 0.65 weight percent of the organic polymeric rheology modifier, based on the combined weight of the resole phenolic resin and the organic polymeric rheology modifier. Combinations of more than one resole phenolic resin and/or more than one organic polymeric rheology modifier may be used if desired.

Alkali-swellable/soluble polymers suitable for use as the organic polymeric rheology modifier include, for example, Alkali-Swellable/soluble Emulsion (ASE) organic polymers, Hydrophobically-modified Alkali-Swellable/soluble Emulsion polymers (HASE), and Hydrophobically modified Ethoxylated URethane polymers (HEUR).

The organic polymeric rheology modifier may be chosen from alkali-swellable/soluble acrylic emulsion polymers (ASE), Hydrophobically-modified alkali-swellable/soluble acrylic emulsion polymers (HASE), and Hydrophobically-modified Ethoxylated URethane (HEUR) organic polymers.

Alkali-Swellable/soluble Emulsion (ASE) rheology modifiers are dispersions of insoluble acrylic polymers in water have a high percentage of acid groups distributed throughout their polymer chains.

When these acid groups are neutralized, the salt that is formed is hydrated. Depending on the concentration of acid groups, the molecular weight and degree of crosslinking, the salt either swells in aqueous solutions or becomes completely water-soluble.

As the concentration of neutralized polymer in an aqueous formulation increases, the polymer chains swell, thereby causing the viscosity to increase.

ASE polymers can be synthesized from acid and acrylate co-monomers, and are generally made through emulsion polymerization. Exemplary commercially available ASE polymers include ACUSOL 810A, ACUSOL 830, ACUSOL 835, and ACUSOL 842 polymers.

Hydrophobically-modified Alkali-Swellable/soluble Emulsion (HASE) polymers are commonly employed to modify the rheological properties of aqueous emulsion systems. Under the influence of a base, organic or inorganic, the HASE particles gradually swell and expand to form a three-dimensional network by intermolecular hydrophobic aggregation between HASE polymer chains and/or with components of the emulsion. This network, combined with the hydrodynamic exclusion volume created by the expanded HASE chains, produces the desired thickening effect. This network is sensitive to applied stress, breaks down under shear and recovers when the stress is relieved.

HASE rheology modifiers can be prepared from the following monomers: (a) an ethylenically unsaturated carboxylic acid, (b) a nonionic ethylenically unsaturated monomer, and (c) an ethylenically unsaturated hydrophobic monomer. Representative HASE polymer systems include those shown in EP 226097 B1 (van Phung et al.), EP 705852 B1 (Doolan et al.), U.S. Pat. No. 4,384,096 (Sonnabend) and U.S. Pat. No. 5,874,495 (Robinson).

Exemplary commercially available HASE polymers include those marketed by Dow Chemical under the trade designations ACUSOL 801S, ACUSOL 805S, ACUSOL 820, and ACUSOL 823.

ASE and HASE rheology modifiers are pH-triggered thickeners. Whether the emulsion polymer in each is water-swellable or water-soluble typically depends on its molecular weight. Both forms are acceptable. Further details concerning synthesis of ASE and HASE polymers can be found, for example, in U.S. Pat. No. 9,631,165 (Droege et al.).

Hydrophobically-modified Ethoxylated URethane (HEUR) polymers are generally synthesized from an alcohol, a diisocyanate and one or more polyalkylene glycols. HEURs are water-soluble polymers containing hydrophobic groups, and are classified as associative thickeners because the hydrophobic groups associate with one another in water. Unlike HASEs, HEURs are nonionic substances and are not dependent on alkali for activation of the thickening mechanism. They develop intra- or intermolecular links as their hydrophobic groups associate with other hydrophobic ingredients in a given formulation. As a general rule, the strength of the association depends on the number, size, and frequency of the hydrophobic capping or blocking units. HEURs develop micelles as would a normal surfactant. The micelles then link between the other ingredients by associating with their surfaces. This builds a three-dimensional network.

Exemplary commercially available HEUR polymers include those marketed by Dow Chemical under the trade designations ACUSOL 880, ACUSOL 882, ACRYSOL RM-2020, and ACRYSOL RM-8W.

Further details concerning HEURs can be found, for example, in U.S. Pat. Appl. Publ. No. 2017/0198238 (Kensicher et al.) and 2017/0130072 (McCulloch et al.) and U.S. Pat. No. 7,741,402 (Bobsein et al.) and U.S. Pat. No. 8,779,055 (Rabasco et al.).

Make layers and size layers are formed by at least partially curing corresponding precursors (i.e., a make layer precursor and a size layer precursor).

The make layer precursor comprises a curable composition according to the present disclosure. The curable composition may also contain additives such as fibers, lubricants, wetting agents, surfactants, pigments, dyes, antistatic agents (e.g., carbon black, vanadium oxide, and/or graphite), coupling agents (e.g., silanes, titanates, and/or zircoaluminates), plasticizers, suspending agents, and the like. The amounts of these optional additives are selected to provide the preferred properties. The coupling agents can improve adhesion to the abrasive particles and/or filler. The curable composition may be thermally-cured, radiation-cured, or a combination thereof.

The curable composition may also contain filler materials, diluent abrasive particles (e.g., as described hereinbelow), or grinding aids, typically in the form of a particulate material. Typically, the particulate materials are inorganic materials. Examples of useful fillers for this disclosure include: metal carbonates (e.g., calcium carbonate (e.g., chalk, calcite, marl, travertine, marble and limestone), calcium magnesium carbonate, sodium carbonate, magnesium carbonate), silica (e.g., quartz, glass beads, glass bubbles and glass fibers) silicates (e.g., talc, clays, (montmorillonite) feldspar, mica, calcium silicate, calcium metasilicate, sodium aluminosilicate, sodium silicate) metal sulfates (e.g., calcium sulfate, barium sulfate, sodium sulfate, aluminum sodium sulfate, aluminum sulfate), gypsum, vermiculite, wood flour, aluminum trihydrate, carbon black, metal oxides (e.g., calcium oxide (lime), aluminum oxide, titanium dioxide), and metal sulfites (e.g., calcium sulfite).

The size layer precursor comprises a thermosetting resin. Examples of suitable thermosetting resins that may be useful for the size layer precursor include, for example, free-radically polymerizable monomers and/or oligomers, epoxy resins, acrylic resins, urethane resins, phenolic resins, urea-formaldehyde resins, melamine-formaldehyde resins, aminoplast resins, cyanate resins, or combinations thereof. Useful binder precursors include thermally curable resins and radiation curable resins, which may be cured, for example, thermally and/or by exposure to radiation. Additional details concerning size layer precursors may be found in U.S. Pat. No. 4,588,419 (Caul et al.), U.S. Pat. No. 4,751,138 (Tumey et al.), and U.S. Pat. No. 5,436,063 (Follett et al.).

The size layer precursor may also be modified by various additives (e.g., fibers, lubricants, wetting agents, surfactants, pigments, dyes, antistatic agents (e.g., carbon black, vanadium oxide, and/or graphite.), coupling agents (e.g., silanes, titanates, zircoaluminates, etc.), plasticizers, suspending agents). Catalysts and/or initiators may be added to thermosetting resins; for example, according to conventional practice and depending on the resin used.

Heat energy is commonly applied to advance curing of the thermosetting resins (e.g., curable compositions according to the present disclosure); however, other sources of energy (e.g., microwave radiation, infrared light, ultraviolet light, visible light, may also be used). The selection will generally be dictated by the particular resin system selected.

Useful abrasive particles may be the result of a crushing operation (e.g., crushed abrasive particles that have been sorted for shape and size) or the result of a shaping operation (i.e., shaped abrasive particles) in which an abrasive precursor material is shaped (e.g., molded), dried, and converted to ceramic material. Combinations of abrasive particles resulting from crushing with abrasive particles resulting from a shaping operation may also be used. The abrasive particles may be in the form of, for example, individual particles, agglomerates, composite particles, and mixtures thereof.

The abrasive particles should have sufficient hardness and surface roughness to function as crushed abrasive particles in abrading processes. Preferably, the abrasive particles have a Mohs hardness of at least 4, at least 5, at least 6, at least 7, or even at least 8.

Suitable abrasive particles include, for example, crushed abrasive particles comprising fused aluminum oxide, heat-treated aluminum oxide, white fused aluminum oxide, ceramic aluminum oxide materials such as those commercially available as 3M CERAMIC ABRASIVE GRAIN from 3M Company, St. Paul, Minnesota, brown aluminum oxide, blue aluminum oxide, silicon carbide (including green silicon carbide), titanium diboride, boron carbide, tungsten carbide, garnet, titanium carbide, diamond, cubic boron nitride, fused alumina zirconia, iron oxide, chromia, zirconia, titania, tin oxide, quartz, feldspar, flint, emery, sol-gel-derived ceramic (e.g., alpha alumina), and combinations thereof. Examples of sol-gel-derived abrasive particles from which the abrasive particles can be isolated, and methods for their preparation can be found, in U.S. Pat. No. 4,314,827 (Leitheiser et al.); U.S. Pat. No. 4,623,364 (Cottringer et al.); U.S. Pat. No. 4,744,802 (Schwabel), U.S. Pat. No. 4,770,671 (Monroe et al.); and U.S. Pat. No. 4,881,951 (Monroe et al.). It is also contemplated that the abrasive particles could comprise abrasive agglomerates such, for example, as those described in U.S. Pat. No. 4,652,275 (Bloecher et al.) or U.S. Pat. No. 4,799,939 (Bloecher et al.). In some embodiments, the abrasive particles may be surface-treated with a coupling agent (e.g., an organosilane coupling agent) or other physical treatment (e.g., iron oxide or titanium oxide) to enhance adhesion of the crushed abrasive particles to the binder. The abrasive particles may be treated before combining them with the binder, or they may be surface treated in situ by including a coupling agent to the binder.

Preferably, the abrasive particles (and especially the abrasive particles) comprise ceramic abrasive particles such as, for example, sol-gel-derived polycrystalline alpha alumina particles. Ceramic abrasive particles composed of crystallites of alpha alumina, magnesium alumina spinel, and a rare earth hexagonal aluminate may be prepared using sol-gel precursor alpha alumina particles according to methods described in, for example, U.S. Pat. No. 5,213,591 (Celikkaya et al.) and U.S. Publ. Pat. Appln. Nos. 2009/0165394 A1 (Culler et al.) and 2009/0169816 A1 (Erickson et al.). Further details concerning methods of making sol-gel-derived abrasive particles can be found in, for example, U.S. Pat. No. 4,314,827 (Leitheiser); U.S. Pat. No. 5,152,917 (Pieper et al.); U.S. Pat. No. 5,435,816 (Spurgeon et al.); U.S. Pat. No. 5,672,097 (Hoopman et al.); U.S. Pat. No. 5,946,991 (Hoopman et al.); U.S. Pat. No. 5,975,987 (Hoopman et al.); and U.S. Pat. No. 6,129,540 (Hoopman et al.); and in U.S. Publ. Pat. Appln. No. 2009/0165394 A1 (Culler et al.).

In some preferred embodiments, useful abrasive particles (especially in the case of the abrasive particles) may be shaped abrasive particles can be found in U.S. Pat. No. 5,201,916 (Berg); U.S. Pat. No. 5,366,523 (Rowenhorst (Re 35,570)); and U.S. Pat. No. 5,984,988 (Berg). U.S. Pat. No. 8,034,137 (Erickson et al.) describes alumina abrasive particles that have been formed in a specific shape, then crushed to form shards that retain a portion of their original shape features. In some embodiments, the abrasive particles are precisely-shaped (i.e., the particles have shapes that are at least partially determined by the shapes of cavities in a production tool used to make them. Details concerning such abrasive particles and methods for their preparation can be found, for example, in U.S. Pat. No. 8,142,531 (Adefris et al.); U.S. Pat. No. 8,142,891 (Culler et al.); and U.S. Pat. No. 8,142,532 (Erickson et al.); and in U.S. Pat. Appl. Publ. Nos. 2012/0227333 (Adefris et al.); 2013/0040537 (Schwabel et al.); and 2013/0125477 (Adefris). One particularly useful precisely-shaped abrasive particle shape is that of a truncated triangular pyramid with sloping sidewalls; for example as set forth in the above cited references.

Surface coatings on the abrasive particles may be used to improve the adhesion between the abrasive particles and a binder material, or to aid in electrostatic deposition of the abrasive particles. In one embodiment, surface coatings as described in U.S. Pat. No. 5,352,254 (Celikkaya) in an amount of 0.1 to 2 percent surface coating to abrasive particle weight may be used. Such surface coatings are described in U.S. Pat. No. 5,213,591 (Celikkaya et al.); U.S. Pat. No. 5,011,508 (Wald et al.); U.S. Pat. No. 1,910,444 (Nicholson); U.S. Pat. No. 3,041,156 (Rowse et al.); U.S. Pat. No. 5,009,675 (Kunz et al.); U.S. Pat. No. 5,085,671 (Martin et al.); U.S. Pat. No. 4,997,461 (Markhoff-Matheny et al.); and U.S. Pat. No. 5,042,991 (Kunz et al.). Additionally, the surface coating may prevent shaped abrasive particles from capping. Capping is the term to describe the phenomenon where metal particles from the workpiece being abraded become welded to the tops of the abrasive particles. Surface coatings to perform the above functions are known to those of skill in the art.

In some embodiments, the abrasive particles may be selected to have a length and/or width in a range of from 0.1 micrometers to 3.5 millimeters (mm), more typically 0.05 mm to 3.0 mm, and more typically 0.1 mm to 2.6 mm, although other lengths and widths may also be used.

The abrasive particles may be selected to have a thickness in a range of from 0.1 micrometer to 1.6 mm, more typically from 1 micrometer to 1.2 mm, although other thicknesses may be used. In some embodiments, abrasive particles may have an aspect ratio (length to thickness) of at least 2, 3, 4, 5, 6, or more.

Typically, crushed abrasive particles are independently sized according to an abrasives industry recognized specified nominal grade. Exemplary abrasive industry recognized grading standards include those promulgated by ANSI (American National Standards Institute), FEPA (Federation of European Producers of Abrasives), and JIS (Japanese Industrial Standard). Such industry accepted grading standards include, for example: ANSI 4, ANSI 6, ANSI 8, ANSI 16, ANSI 24, ANSI 30, ANSI 36, ANSI 40, ANSI 50, ANSI 60, ANSI 80, ANSI 100, ANSI 120, ANSI 150, ANSI 180, ANSI 220, ANSI 240, ANSI 280, ANSI 320, ANSI 360, ANSI 400, and ANSI 600; FEPA P8, FEPA P12, FEPA P16, FEPA P24, FEPA P30, FEPA P36, FEPA P40, FEPA P50, FEPA P60, FEPA P80, FEPA P100, FEPA P120, FEPA P150, FEPA P180, FEPA P220, FEPA P320, FEPA P400, FEPA P500, FEPA P600, FEPA P800, FEPA P1000, FEPA P1200; FEPA F8, FEPA F12, FEPA F16, and FEPA F24; and JIS 8, JIS 12, JIS 16, JIS 24, JIS 36, JIS 46, JIS 54, JIS 60, JIS 80, JIS 100, JIS 150, JIS 180, JIS 220, JIS 240, JIS 280, JIS 320, JIS 360, JIS 400, JIS 500, JIS 600, JIS 800, JIS 1000, JIS 1500, JIS 2500, JIS 4000, JIS 6000, JIS 8000, and JIS 10,000. More typically, the crushed aluminum oxide particles and the non-seeded sol-gel derived alumina-based abrasive particles are independently sized to ANSI 60 and 80, or FEPA F36, F46, F54 and F60 or FEPA P60 and P80 grading standards.

Alternatively, the abrasive particles can be graded to a nominal screened grade using U.S.A. Standard Test Sieves conforming to ASTM E-11 "Standard Specification for Wire Cloth and Sieves for Testing Purposes". ASTM E-11 prescribes the requirements for the design and construction of testing sieves using a medium of woven wire cloth mounted in a frame for the classification of materials according to a designated particle size. A typical designation may be represented as −18+20 meaning that the shaped abrasive particles pass through a test sieve meeting ASTM E-11 specifications for the number 18 sieve and are retained on a test sieve meeting ASTM E-11 specifications for the number 20 sieve. In one embodiment, the shaped abrasive particles have a particle size such that most of the particles pass through an 18 mesh test sieve and can be retained on a 20, 25, 30, 35, 40, 45, or 50 mesh test sieve. In various embodiments, the shaped abrasive particles can have a nominal screened grade comprising: −18+20, −20+25, −25+30, −30+35, −35+40, −40+45, −45+50, −50+60, −60+70, −70+80, −80+100, −100+120, −120+140, −140+170, −170+200, −200+230, −230+270, −270+325, −325+400, −400+450, −450+500, or −500+635. Alternatively, a custom mesh size could be used such as −90+100.

A grinding aid is a material that has a significant effect on the chemical and physical processes of abrading, which results in improved performance. Grinding aids encompass a wide variety of different materials and can be inorganic or organic based. Examples of chemical groups of grinding aids include waxes, organic halide compounds, halide salts and metals and their alloys. The organic halide compounds will typically break down during abrading and release a halogen acid or a gaseous halide compound. Examples of such materials include chlorinated waxes like tetrachloronaphthalene, pentachloronaphthalene, and polyvinyl chloride. Examples of halide salts include sodium chloride, potassium cryolite, sodium cryolite, ammonium cryolite, potassium tetrafluoroborate, sodium tetrafluoroborate, silicon fluorides, potassium chloride, and magnesium chloride. Examples of metals include tin, lead, bismuth, cobalt, antimony, cadmium, iron, and titanium.

Other miscellaneous grinding aids include sulfur, organic sulfur compounds, graphite, and metallic sulfides. A combination of different grinding aids may be used, and, in some instances, this may produce a synergistic effect.

Grinding aids can be particularly useful in coated abrasives. In coated abrasive articles, grinding aid is typically used in a supersize coat, which is applied over the surface of the abrasive particles. Sometimes, however, the grinding aid is added to the size coat. Typically, the amount of grinding aid incorporated into coated abrasive articles are about 50-800 grams per square meter ($g/m^2$), preferably about 80-475 $g/m^2$.

Further details regarding coated abrasive articles and methods of their manufacture can be found, for example, in U.S. Pat. No. 4,734,104 (Broberg); U.S. Pat. No. 4,737,163 (Larkey); U.S. Pat. No. 5,203,884 (Buchanan et al.); U.S. Pat. No. 5,152,917 (Pieper et al.); U.S. Pat. No. 5,378,251 (Culler et al.); U.S. Pat. No. 5,436,063 (Follett et al.); U.S. Pat. No. 5,496,386 (Broberg et al.); U.S. Pat. No. 5,609,706 (Benedict et al.); U.S. Pat. No. 5,520,711 (Helmin); U.S. Pat. No. 5,961,674 (Gagliardi et al.), and U.S. Pat. No. 5,975,988 (Christianson).

Nonwoven abrasive articles typically include an open porous lofty fiber web having abrasive particles distributed throughout the structure and adherently bonded therein by a resole-phenolic-resin-based binder material according to the present disclosure. Examples of filaments include polyester fibers, polyamide fibers, and polyaramid fibers.

Figure 2A:
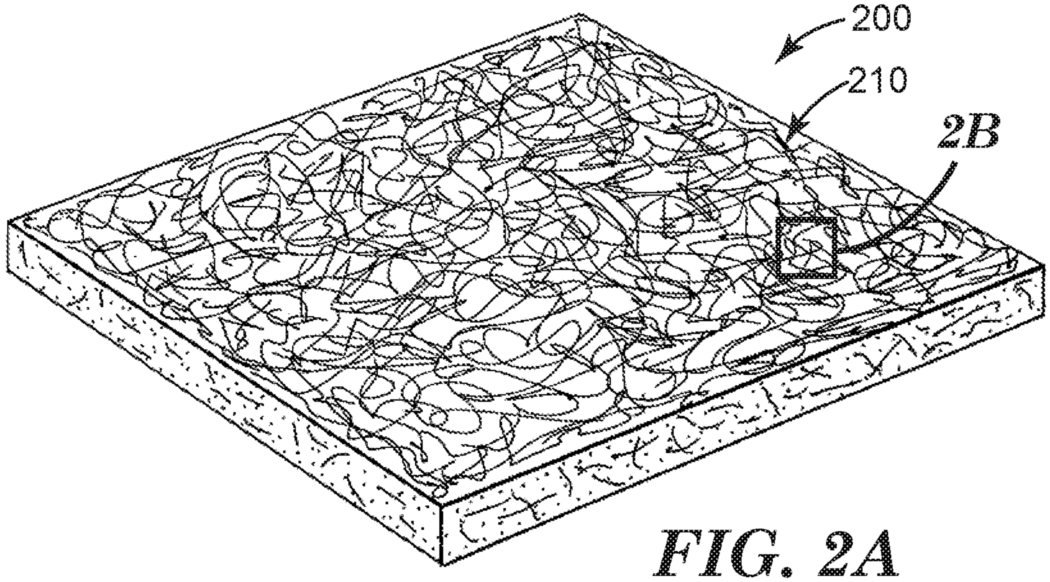
FIG. 2A is a perspective view of exemplary nonwoven abrasive article 200 according to the present disclosure.
Figure 2B:
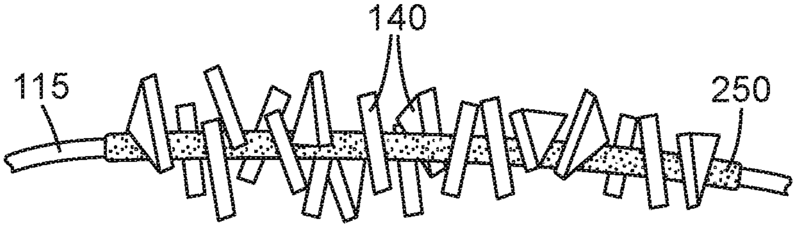
FIG. 2B is an enlarged view of region 2B of nonwoven abrasive article 200 shown in FIG. 2A.

An exemplary embodiment of a nonwoven abrasive article 200 is shown in FIGS. 2A and 2B. Referring now to FIGS. 2A and 2B, lofty open low-density fibrous web 210 is formed of entangled fibers 115. Abrasive particles 140 are secured to fibrous web 210 on exposed surfaces of fibers 115 by binder material 250, which also binds fibers 115 together at points where they contact one another, resulting in cutting points being outwardly oriented relative to fibers 115.

Nonwoven fiber webs suitable for use are known in the abrasives art. Typically, the nonwoven fiber web comprises an entangled web of fibers. The fibers may comprise continuous fiber, staple fiber, or a combination thereof. For example, the fiber web may comprise staple fibers having a length of at least about 20 millimeters (mm), at least about 30 mm, or at least about 40 mm, and less than about 110 mm, less than about 85 mm, or less than about 65 mm, although shorter and longer fibers (e.g., continuous filaments) may also be useful. The fibers may have a fineness or linear density of at least about 1.7 decitex (dtex, i.e., grams/10000 meters), at least about 6 dtex, or at least about 17 dtex, and less than about 560 dtex, less than about 280 dtex, or less than about 120 dtex, although fibers having lesser and/or greater linear densities may also be useful. Mixtures of fibers with differing linear densities may be useful, for example, to provide an abrasive article that upon use will result in a specifically preferred surface finish. If a spunbond nonwoven is used, the filaments may be of substantially larger diameter, for example, up to 2 mm or more in diameter.

The fiber web may be made, for example, by conventional air laid, carded, stitch bonded, spun bonded, wet laid, and/or melt blown procedures. Air laid fiber webs may be prepared using equipment such as, for example, that available under the trade designation RANDO WEBBER from Rando Machine Company of Macedon, New York.

Nonwoven fiber webs are typically selected to be compatible with adhering binders and abrasive particles while also being compatible with other components of the article, and typically can withstand processing conditions (e.g., temperatures) such as those employed during application and curing of the curable binder precursor. The fibers may be chosen to affect properties of the abrasive article such as, for example, flexibility, elasticity, durability or longevity, abrasiveness, and finishing properties. Examples of fibers that may be suitable include natural fibers, synthetic fibers, and mixtures of natural and/or synthetic fibers. Examples of synthetic fibers include those made from polyester (e.g., polyethylene terephthalate), nylon (e.g., hexamethylene adipamide, polycaprolactam), polypropylene, acrylonitrile (i.e., acrylic), rayon, cellulose acetate, polyvinylidene chloride-vinyl chloride copolymers, and vinyl chloride-acrylonitrile copolymers. Examples of suitable natural fibers include cotton, wool, jute, and hemp. The fiber may be of virgin material or of recycled or waste material, for example, reclaimed from garment cuttings, carpet manufacturing, fiber manufacturing, or textile processing. The fiber may be homogenous or a composite such as a bicomponent fiber (e.g., a co-spun sheath-core fiber). The fibers may be tensilized and crimped, but may also be continuous filaments such as those formed by an extrusion process. Combinations of fibers may also be used.

Prior to coating and/or impregnation with the curable composition (i.e., a binder precursor composition), the nonwoven fiber web typically has a weight per unit area (i.e., basis weight) of at least about 50 grams per square meter (gsm), at least about 100 gsm, or at least about 150 gsm; and/or less than about 600 gsm, less than about 500 gsm, or less than about 400 gsm, as measured prior to any coating (e.g., with the curable binder precursor or optional pre-bond resin), although greater and lesser basis weights may also be used. In addition, prior to impregnation with the curable binder precursor, the fiber web typically has a thickness of at least about 3 mm, at least about 6 mm, or at least about 10 mm; and/or less than about 100 mm, less than about 50 mm, or less than about 25 mm, although greater and lesser thicknesses may also be useful.

Frequently, as known in the abrasives art, it is useful to apply a prebond resin to the nonwoven fiber web prior to coating with the curable binder precursor. The prebond resin serves, for example, to help maintain the nonwoven fiber web integrity during handling, and may also facilitate bonding of the urethane binder to the nonwoven fiber web. Examples of prebond resins include phenolic resins, urethane resins, hide glue, acrylic resins, urea-formaldehyde resins, melamine-formaldehyde resins, epoxy resins, and combinations thereof. The amount of pre-bond resin used in this manner is typically adjusted toward the minimum amount consistent with bonding the fibers together at their points of crossing contact. In those cases, wherein the nonwoven fiber web includes thermally bondable fibers, thermal bonding of the nonwoven fiber web may also be helpful to maintain web integrity during processing.

In those nonwoven abrasive articles including a lofty open nonwoven fiber web (e.g., hand pads, and surface conditioning discs and belts, flap brushes, or nonwoven abrasive webs used to make unitized or convolute abrasive wheels) many interstices between adjacent fibers that are substantially unfilled by the binder and abrasive particles, resulting in a composite structure of extremely low density having a network on many relatively large intercommunicated voids. The resulting lightweight, lofty, extremely open fibrous construction is essentially non-clogging and non-filling in nature, particularly when used in conjunction with liquids such as water and oils. These structures also can be readily cleaned upon simple flushing with a cleansing liquid, dried, and left for substantial periods of time, and then reused. Towards these ends, the voids in these nonwoven abrasive articles may make up at least about 75 percent, and preferably more, of the total space occupied by the composite structure.

One method of making nonwoven abrasive articles according to the present disclosure includes the steps in the following order: applying a prebond coating to the nonwoven fiber web (e.g., by roll-coating or spray coating), curing the prebond coating, impregnating the nonwoven fiber web with a make layer precursor that is a curable binder material precursor according to the present disclosure (e.g., by roll-coating or spray coating), applying abrasive particles to the make layer precursor, at least partially curing make layer precursor, and then optionally applying a size layer precursor (e.g., as described herein above), and curing it and the make layer precursor (e.g., as described hereinabove), if necessary.

Further details regarding nonwoven abrasive articles and methods for their manufacture can be found, for example, in U.S. Pat. No. 2,958,593 (Hoover et al.); U.S. Pat. No. 4,227,350 (Fitzer); U.S. Pat. No. 4,991,362 (Heyer et al.); U.S. Pat. No. 5,712,210 (Windisch et al.); U.S. Pat. No. 5,591,239 (Edblom et al.); U.S. Pat. No. 5,681,361 (Sanders); U.S. Pat. No. 5,858,140 (Berger et al.); U.S. Pat. No. 5,928,070 (Lux); and U.S. Pat. No. 6,017,831 (Beardsley et al.).

In some embodiments, the substrate comprises a fiber scrim, for example, in the case of screen abrasives, or if included in bonded abrasives such as, for example, cutoff wheels and depressed center grinding wheels. Suitable fiber scrims may include woven, and knitted cloths, for example, which may include inorganic and/or organic fibers. For example, the fibers in the scrim may include wire, ceramic fiber, glass fiber (for example, fiberglass), and organic fibers (for example, natural and/or synthetic organic fibers). Examples of organic fibers include cotton fibers, jute fibers, and canvas fibers. Examples of synthetic fibers include nylon fibers, rayon fibers, polyester fibers, and polyimide fibers).

Abrasive articles according to the present disclosure are useful, for example, for abrading a workpiece. Such a method may comprise: frictionally contacting an abrasive articles according to the present disclosure with a surface of the workpiece, and moving at least one of the abrasive article and the surface of the workpiece relative to the other to abrade at least a portion of the surface of the workpiece. Methods for abrading with abrasive articles according to the present disclosure include, for example, snagging (i.e., high-pressure high stock removal) to polishing (e.g., polishing medical implants with coated abrasive belts), wherein the latter is typically done with finer grades (e.g., ANSI 220 and finer) of abrasive particles. The size of the abrasive particles used for a particular abrading application will be apparent to those skilled in the art.

Abrading may be carried out dry or wet. For wet abrading, the liquid may be introduced supplied in the form of a light mist to complete flood. Examples of commonly used liquids include: water, water-soluble oil, organic lubricant, and emulsions. The liquid may serve to reduce the heat associated with abrading and/or act as a lubricant. The liquid may contain minor amounts of additives such as bactericide, antifoaming agents, and the like.

Examples of workpieces include aluminum metal, carbon steels, mild steels (e.g., 1018 mild steel and 1045 mild steel), tool steels, stainless steel, hardened steel, titanium, glass, ceramics, wood, wood-like materials (e.g., plywood and particle board), paint, painted surfaces, and organic coated surfaces. The applied force during abrading typically ranges from about 1 to about 100 kilograms (kg), although other pressures can also be used.

Select Embodiments of the Present Disclosure

In a first embodiment, the present disclosure provides a method of making an abrasive article comprising:

disposing a curable composition on a substrate, wherein the curable composition comprises a resole phenolic resin and an organic polymeric rheology modifier, wherein the organic polymeric rheology modifier comprises an alkali-swellable/soluble polymer, and wherein, on a solids basis, the amount of the resole phenolic resin comprises from 99.01 to 99.98 weight percent of the combined weight of the resole phenolic resin and the organic polymeric rheology modifier;

adhering abrasive particles to the curable composition; and at least partially curing the curable composition.

In a second embodiment, the present disclosure provides a method of making an abrasive article according to the first embodiment, wherein the organic polymeric rheology modifier is selected from the group consisting of alkali-swellable/soluble acrylic polymers, hydrophobically-modified alkali-swellable/soluble acrylic polymers, hydrophobically-modified ethoxylated urethane polymers, and combinations thereof.

In a third embodiment, the present disclosure provides a method of making an abrasive article according to the first or second embodiment, wherein the organic polymeric rheology modifier is selected from the group consisting of alkali-swellable/soluble acrylic polymers.

In a fourth embodiment, the present disclosure provides a method of making an abrasive article according to any one of the first to third embodiments, wherein, on a solids basis, the amount of the resole phenolic resin comprises 99.35 to 99.9 weight percent of the combined weight of the resole phenolic resin and the organic polymeric rheology modifier.

In a fifth embodiment, the present disclosure provides a method of making an abrasive article according to the fourth embodiment, wherein the abrasive particles comprise shaped abrasive particles.

In a sixth embodiment, the present disclosure provides a method of making an abrasive article according to the fourth embodiment, wherein the shaped abrasive particles comprise precisely-shaped abrasive particles.

In a seventh embodiment, the present disclosure provides a method of making an abrasive article according to any one of the first to sixth embodiments, wherein the substrate comprises a backing member having first and second opposed major surfaces, the method further comprising:

disposing a size layer precursor onto at least a portion of the abrasive particles and said at least partially cured curable composition; and at least partially curing the size layer precursor to provide a coated abrasive article.

In an eighth embodiment, the present disclosure provides a method of making an abrasive article according to any one of the first to seventh embodiments, wherein the substrate comprises a lofty open nonwoven fiber web.

In a ninth embodiment, the present disclosure provides a method of making an abrasive article according to any one of the first to eighth embodiments, wherein the substrate comprises a fiber scrim.

In a tenth embodiment, the present disclosure provides an abrasive article comprising abrasive particles adhered to a substrate by a binder material comprising an at least partially cured resole phenolic resin and an organic polymeric rheology modifier, wherein the amount of the at least partially cured resole phenolic resin comprises 99.01 to 99.98 weight percent of the combined weight of the at least partially cured resole phenolic resin and the organic polymeric rheology modifier.

In an eleventh embodiment, the present disclosure provides an abrasive article according to the tenth embodiment, wherein the organic polymeric rheology modifier is selected from the group consisting of alkali-swellable/soluble acrylic polymers, hydrophobically-modified alkali-swellable/soluble acrylic polymers, hydrophobically-modified ethoxylated urethane polymers, and combinations thereof.

In a twelfth embodiment, the present disclosure provides an abrasive article according to the tenth or eleventh embodiment, wherein the organic polymeric rheology modifier is selected from the group consisting of alkali-swellable/soluble acrylic polymers.

In a thirteenth embodiment, the present disclosure provides an abrasive article according to any one of the tenth to twelfth embodiments, wherein the amount of the at least partially cured resole phenolic resin comprises 99.35 to 99.9 weight percent of the combined weight of the at least partially cured resole phenolic resin and the organic polymeric rheology modifier.

In a fourteenth embodiment, the present disclosure provides an abrasive article according to the thirteenth embodiment, wherein the abrasive particles comprise shaped abrasive particles.

In a fifteenth embodiment, the present disclosure provides an abrasive article according to the thirteenth embodiment, wherein the shaped abrasive particles comprise precisely-shaped abrasive particles.

In a sixteenth embodiment, the present disclosure provides an abrasive article according to any one of the tenth to fifteenth embodiments, wherein the abrasive article is a coated abrasive article.

In a seventeenth embodiment, the present disclosure provides an abrasive article according to any one of the tenth to sixteenth embodiments, wherein the abrasive article is a nonwoven abrasive article.

In an eighteenth embodiment, the present disclosure provides an abrasive article according to any one of the tenth to seventeenth embodiments, wherein the substrate comprises a fiber scrim.

Objects and advantages of this disclosure are further illustrated by the following non-limiting examples, but the particular materials and amounts thereof recited in these examples, as well as other conditions and details, should not be construed to unduly limit this disclosure.

EXAMPLES

Unless otherwise noted, all parts, percentages, ratios, etc. in the Examples and the rest of the specification are by weight.

MATERIALS USED IN THE EXAMPLES

| ABBREVIATION | DESCRIPTION AND SOURCE |
|---|---|
| PF | Phenol-formaldehyde resin (75% solids in water) having a phenol to formaldehyde molar ratio of 1:1.5-2.1, and catalyzed with 2.5 percent by weight potassium hydroxide. |
| 835 | An alkali-swellable acrylic polymer emulsion (ASE) obtained under the trade designation ACUSOL 835 from Dow Chemical Company, Midland, Michigan, as an aqueous emulsion with 29.32% solids content. |
| 1162 | A hydrophobically-modified alkali-swellable acrylic polymer emulsion (HASE) obtained as RHEOVIS HS 1162 from BASF as an aqueous emulsion with 35.2 % solids content. |
| FIL 1 | Calcium silicate obtained as 400 WOLLASTOCOAT 10014 from |

-continued

| MATERIALS USED IN THE EXAMPLES | |
|---|---|
| ABBREVIATION | DESCRIPTION AND SOURCE |
| | NYCO, Willsboro, New York |
| FIL2 | Hydrophilic amorphous fumed silica obtained as CAB-O-SIL M-5 from Cabot Corporation, Alpharetta, Georgia |
| FIL3 | Cryolite obtained as CRYOLITE RTN-C from FREEBEE A/S, Ullerslev, Denmark. |
| SAP1 | Shaped abrasive particles prepared according to the disclosure of U.S. Pat. No. 8,142,531 (Adefris et al). The shaped abrasive particles were prepared by molding alumina sol gel in equilateral triangle-shaped polypropylene mold cavities. After drying and firing, the resulting shaped abrasive particles, which were shaped as truncated triangular pyramids, were about 1.4 mm (side length) × 0.35 mm (thickness), with a draft angle approximately 98 degrees. |
| RIO | Red iron oxide pigment obtained as KROMA RO-3097 from Elementis, East Saint Louis, Illinois. |
| RIO2 | Red iron oxide pigment obtained as KROMA RO-8097 from Elementis. |
| ER | A 60% solids epoxy resin dispersion obtained as EPIREZ 3522 W60 from Hexion, Columbus, Ohio. |
| LR | A 53% solids latex dispersion obtained as SureTac 1585 from Dyna-Tech Adhesives Inc., Grafton, West Virginia. |
| SF1 | Surfactant obtained as Aerosol OT-NV from Cytec-Solvay Group, Stamford, Connecticut. |
| SF2 | Antifoam obtained as Antifoam Emulsion 1430 from Dow Chemical Company |
| EMI | 2,4-Diethylimidazole obtained as 2,4 EMI from Air Products, Allentown, Pennsylvania. |

Test Methods

Viscosity Measurement

The flow characteristics of the phenolic copolymer mixtures were characterized by continuous flow rheometry using a TA Instruments Discovery Hybrid Rheometer 3 (TA Instruments, New Castle, Delaware) equipped with a stainless steel concentric cylinder geometry utilizing a conical end rotor with a 28.01 mm diameter and 41.96 mm height, cup with a 30.35 mm diameter, and a TA instruments DHR & AR-Series Smart Swap Concentric Cylinder Peltier jacket for temperature control. Samples approximately 24 milliliters in volume were loaded onto the geometry cup via polypropylene syringe and the rotor was brought to a gap height 5.919 mm. An aluminum collar was fitted on the top of the cup while allowing free rotation of the rotor to minimize water evaporation form the sample, while allowing free rotation of the rotor. Individual samples were allowed to thermally equilibrate in the instrument for 300 seconds before testing. The stress dependent flow behavior of the mixtures was investigated at 20 and 60° C. using a logarithmic sweep from 0.001-3000 pascals (Pa) applied stress selecting 5 individual stress points per decade. At each individual applied stress, the samples were equilibrated for 60 seconds followed by 10 seconds of data collection that was then averaged and recorded. Tables 4 and 5, below, report the viscosity measured at 0.001 $s^{-1}$ (i.e., $\mu_{0.001}$) and 100 $s^{-1}$ (i.e., $\mu_{100}$) as well as the shear thinning index (I) defined as the ratio between the two measured viscosities according to equation (1) for all samples tested.

$$I = \frac{\mu_{0.001}}{\mu_{100}} \quad (1)$$

Curable Compositions 1-7 and Comparative Compositions A-E

Comparative Compositions A-C were separately prepared by combining all components 32-ounce (950 mL) 112-mm diameter polypropylene straight walled jars (FlackTek Inc., Landrum, South Carolina) according to Table 1 and sealed with a screw cap. The jars were mixed in a Dual Asymmetric Centrifuge (DAC) SPEEDMIXER (FlackTek Inc., Landrum, South Carolina) for 2 minutes at 2500 rpm and then allowed to cool to ambient temperature (approximately 23° C.). If the mixture was not used for testing immediately, it was stored in a refrigerator at 10° C. until use.

Curable Compositions 1-7 and Comparative Composition D-E were separately prepared by combining masses of Comparative Compositions A-C as specified into 4-ounce (120 mL) 70-mm diameter polypropylene straight walled jars (Taral Plastics, Union City, California) according to Table 2 and sealed with a screw cap. The jars were mixed in a Dual Asymmetric Centrifuge (DAC) SPEEDMIXER (FlackTek Inc., Landrum, South Carolina) for 2 minutes at 2500 rpm and then allowed to cool to ambient temperature (approximately 23° C.). If the mixture was not used for testing immediately, it was stored in a refrigerator at 10° C. until use.

TABLE 1

| | COMPARATIVE COMPOSITION | | |
|---|---|---|---|
| | A | B | C |
| COMPONENT | Amount in grams | | |
| PF | 156.27 | 104.18 | 104.16 |
| 835 | | 5.83 | |
| 1162 | | | 4.85 |
| FIL 1 | 136.46 | 90.99 | 90.98 |
| WATER | 7.49 | 4.97 | 4.86 |
| | % Resole Phenolic solids of total weight of Resole Phenolic solids + Organic polymeric rheology modifier solids | | |
| | 100.0 | 97.85 | 97.86 |
| | % Organic polymeric rheology modifier solids of total weight of Resole Phenolic solids + Organic polymeric rheology modifier solids | | |
| | 0 | 2.14 | 2.14 |

TABLE 2

| COMPONENT | CURABLE COMPOSITION 1 | 2 | 3 | 4 | 5 |
|---|---|---|---|---|---|
| | Amount in grams | | | | |
| A | 37.50 | 42.50 | 47.50 | 48.75 | 49.50 |
| B | 12.50 | 7.50 | 2.50 | 1.25 | 0.50 |
| C | | | | | |
| | % Resole Phenolic solids of total weight of Resole Phenolic solids + Organic polymeric rheology modifier solids | | | | |
| | 99.47 | 99.68 | 99.84 | 99.95 | 99.98 |
| | % Organic polymeric rheology modifier solids of total weight of Resole Phenolic solids + Organic polymeric rheology modifier solids | | | | |
| | 0.53 | 0.32 | 0.16 | 0.05 | 0.02 |

TABLE 3

| COMPONENT | CURABLE COMPOSITION 6 | 7 | COMPARATIVE COMPOSITION D | E |
|---|---|---|---|---|
| | Amount in grams | | | |
| A | 42.50 | 49.50 | 25.00 | 49.77 |
| B | | | 25.00 | 0.23 |
| C | 7.50 | 0.50 | | |
| | % Resole Phenolic solids of total weight of Resole Phenolic solids + Organic polymeric rheology modifier solids | | | |
| | 99.68 | 99.98 | 98.93 | 99.99 |
| | % Organic polymeric rheology modifier solids of total weight of Resole Phenolic solids + Organic polymeric rheology modifier solids | | | |
| | 0.32 | 0.02 | 1.07 | 0.01 |

Viscosity Measurements of Curable Compositions 1-8 and Comparative Compositions A-D Samples were tested according to the Viscosity Measurement Test Method as described hereinbefore. Results are reported in Tables 4 and 5, below.

TABLE 4

| CURABLE COMPOSITION | Viscosity (Pa · s), 20° C. 0.001 $s^{-1}$ | 100 $s^{-1}$ | I |
|---|---|---|---|
| 1 | 33.24 | 10.54 | 3.15 |
| 2 | 108.55 | 9.89 | 10.98 |
| 3 | 469.59 | 9.64 | 48.69 |
| 4 | 709.34 | 9.67 | 73.34 |
| 5 | 92.37 | 9.34 | 9.89 |
| 6 | 25.37 | 13.74 | 1.84 |
| 7 | 203.72 | 10.22 | 22.57 |
| COMPARATIVE COMPOSITION | | | |
| A | 13.71 | 11.30 | 1.21 |
| B | 24.51 | 11.31 | 2.17 |
| C | 99.73 | 23.68 | 4.21 |
| D | 26.81 | 12.46 | 2.15 |
| E | 34.17 | 10.16 | 3.36 |

TABLE 5

| CURABLE COMPOSITION | Viscosity (Pa · s), 60° C. 0.001 $s^{-1}$ | 100 $s^{-1}$ | I |
|---|---|---|---|
| 1 | 2794.07 | 0.79 | 3554.94 |
| 2 | 3627.94 | 0.75 | 4856.60 |
| 3 | 2647.14 | 0.69 | 3820.14 |
| 4 | 1318.79 | 0.66 | 1992.32 |
| 5 | 253.90 | 0.61 | 417.23 |
| 6 | 149.737 | 0.79 | 189.74 |
| 7 | 551.42 | 0.64 | 857.26 |
| COMPARATIVE COMPOSITION | | | |
| A | 45.54 | 0.63 | 71.76 |
| B | 354.50 | 0.70 | 505.84 |
| C | 15.30 | 2.43 | 6.12 |
| D | 1146.76 | 0.84 | 1360.22 |
| E | 55.26 | 0.62 | 89.25 |

Preparation of Coated Abrasive Make, Size, and Supersize Layer Precursors

Make Layer Precursor A (MLP-A)

A 17-liter pail was charged with 13,007 grams of PF, 11359 grams of FIL1 and 568 grams for water. The resin was mixed with an overhead stirrer for 30 minutes at 41° C.

Make Layer Precursor 1 (MLP-1)

A 17-liter pail was charged with 13,007 grams of PF, 11359 grams for FIL1, 568 grams of water and 127 grams of 835. The resin was mixed with an overhead stirrer for 30 minutes at 41° C. The resultant mixture was 99.62% resole phenolic of the total solids weight of resole phenolic solids plus organic polymeric rheology modifier solids.

Make Layer Precursor 2 (MLP-2)

A 17-liter pail was charged with 13,007 grams of PF, 11359 grams for FIL1, 568 grams of water and 213 grams of 835. The resin was mixed with an overhead stirrer for 30 minutes at 41° C. The resultant mixture was 99.36% resole phenolic of the total solids weight of resole phenolic solids plus organic polymeric rheology modifier solids Size Layer Precursor 1 (SLP-1)

A 17-liter pail was charged with 11100 grams for PF, 5800 grams for FIL1, 5800 grams FIL3, 420 grams ADD5, 118 grams ADD3 and 2000 grams water. The resin was mixed with an overhead stirrer for 30 minutes at room temperature.

Supersize Layer Precursor 1 (SSLP-1)

A 3-liter plastic container was charged with 438 grams of ER, 173 grams of water, 8.7 grams of FIL2, 55.1 grams of RIO2, 13.8 grams of EMI, 18.1 grams of SF1, 1.9 grams of SF2 and 319.4 grams of LR and then mixed for 10 minutes with an overhead mechanical stirrer. Next, 1972 grams of FIL4 was added over a 15-minute period. The resultant mixture was stirred for 15 minutes with an overhead stirrer.

Comparative Example CE-A

Comparative Example CE-A was prepared by roll coating make resin MLP-A at 41° C. onto a continuous 30.48 cm wide polyester backing (described in Example 12 of U.S. Pat. No. 6,843,815 Thurber et al.) at a coating weight of 197 grams per square meter (gsm) followed by electrostatically coating mineral SAP1 at a weight of 559 grams per square meter (gsm). The coated material was cured at 79° C. for 15 minutes and at 100° C. for 90 minutes. The resultant material was then roll coated with SLP-1 at a coat weight of 508 grams per square meter (gsm). The material was cured at 79° C. for 20 minutes and at 100° C. for 65 minutes. The resultant material was then roll coated with SSLP-1 at a coat weight of 487 grams per square meter (gsm). The material was final cured at 79° C. for 30 minutes at 102° C. for 16 hours and at 109° C. for 1 hour.

Example 1

Example 1 was prepared by roll coating make resin MLP-1 at 41° C. onto a continuous 30.48 cm wide polyester backing (described in Example 12 of U.S. Pat. No. 6,843,815 Thurber et al.) at a coating weight of 189 grams per square meter (gsm) followed by electrostatically coating mineral SAP1 at a weight of 546 grams per square meter (gsm). The coated material was cured at 79° C. for 15 minutes and at 100° C. for 90 minutes. The resultant material was then roll coated with SLP-1 at a coat weight of 517 grams per square meter (gsm). The material was cured at 79° C. for 20 minutes and at 100° C. for 65 minutes. The resultant material was then roll coated with SSLP-1 at a coat weight of 462 grams per square meter (gsm). The material was final cured at 79° C. for 30 minutes at 102° C. for 16 hours and at 109° C. for 1 hour.

Example 2

Example 2 was prepared by roll coating make resin MLP-2 at 41° C. onto a continuous 30.48 cm wide polyester backing (described in Example 12 of U.S. Pat. No. 6,843,815 Thurber et al.) at a coating weight of 181 grams per square meter (gsm) followed by electrostatically coating mineral SAP1 at a weight of 533 grams per square meter (gsm). The coated material was cured at 79° C. for 15 minutes and at 10° C. for 90 minutes. The resultant material was then roll coated with SLP-1 at a coat weight of 499 grams per square meter (gsm). The coated material was cured at 79° C. for 15 minutes and at 100° C. for 90 minutes. The resultant material was then roll coated with comparative SSLP-1 at a coat weight of 475 grams per square meter (gsm). The material was final cured at 79° C. for 30 minutes at 102° C. for 16 hours and at 109° C. for 1 hour.

Grinding Test

The Grinding Test was conducted on 10.16 cm cy 91.44 cm belts converted from coated abrasive samples Comparative Example CE-A, Example 1, and Example 2. The workpiece was a 304 stainless steel bar on which the surface to be abraded measured 1.9 cm×1.9 cm. A 20.3 cm diameter 70 durometer rubber, 1:1 land to groove ratio, serrated contact wheel was used. The belt was run at 2750 rpm. The workpiece was applied to the center part of the belt at a normal force of 4.4 kg. The test consisted for measuring the weight loss of the workpiece after 15 seconds of grinding. The workpiece would then be cooled and tested again. The test concluded after 40 cycles. The initial cut in grams was defined total cut after two cycles, cut rate is grams was defined as total cut at 10 cycles minus total cut of 3 cycles divided by seven. The total cut in grams is defined as total cut after 40 cycles.

TABLE 6

| | GRINDING TEST PERFORMANCE | | |
|---|---|---|---|
| SPECIMEN | Initial Cut, grams | Cut rate, grams | Total Cut, grams |
| COMPARATIVE EXAMPLE CE-A | 58.8 | 25.4 | 674 |
| EXAMPLE 1 | 61.6 | 26.1 | 722 |
| EXAMPLE 2 | 61 | 27.2 | 753 |

All cited references, patents, and patent applications in this application that are incorporated by reference, are incorporated in a consistent manner. In the event of inconsistencies or contradictions between portions of the incorporated references and this application, the information in this application shall control. The preceding description, given in order to enable one of ordinary skill in the art to practice the claimed disclosure, is not to be construed as limiting the scope of the disclosure, which is defined by the claims and all equivalents thereto.

What is claimed is:

1. A method of making an abrasive article comprising:

disposing a make layer precursor consisting essentially of a curable composition on a substrate, wherein the curable composition comprises a resole phenolic resin and an organic polymeric rheology modifier, wherein the organic polymeric rheology modifier comprises an alkali-swellable/soluble polymer, and, on a solids basis, wherein the amount of the resole phenolic resin comprises 99.01 to 99.98 weight percent of the combined weight of the resole phenolic resin and the organic polymeric rheology modifier;

adhering abrasive particles to the curable composition; and at least partially curing the curable composition.

2. The method of claim 1, wherein the organic polymeric rheology modifier is selected from the group consisting of alkali-swellable/soluble acrylic polymers, hydrophobically-modified alkali-swellable/soluble acrylic polymers, hydrophobically-modified ethoxylated urethane polymers, and combinations thereof.

3. The method of claim 1, wherein the organic polymeric rheology modifier is selected from the group consisting of alkali-swellable/soluble acrylic polymers.

4. The method of claim 1, wherein, on a solids basis, the amount of the resole phenolic resin comprises 99.35 to 99.9 weight percent of the combined weight of the resole phenolic resin and the organic polymeric rheology modifier.

5. The method of claim 1, wherein the abrasive particles comprise shaped abrasive particles.

6. The method of claim 5, wherein the shaped abrasive particles comprise precisely-shaped abrasive particles.

7. The method of claim 1, wherein the substrate comprises a backing member having first and second opposed major surfaces, the method further comprising:

disposing a size layer precursor onto at least a portion of the abrasive particles and said at least partially cured curable composition; and at least partially curing the size layer precursor to provide a coated abrasive article.

8. The method of claim 1, wherein the substrate comprises a lofty open nonwoven fiber web.

9. The method of claim 1, wherein the substrate comprises a fiber scrim.

10. An abrasive article comprising abrasive particles adhered to a substrate by a binder material comprising a make layer precursor consisting essentially of an at least partially cured resole phenolic resin and an organic polymeric rheology modifier, wherein the amount of the at least partially cured resole phenolic resin comprises 99.01 to 99.98 weight percent of the combined weight of the at least partially cured resole phenolic resin and the organic polymeric rheology modifier.

11. The abrasive article of claim 10, wherein the organic polymeric rheology modifier is selected from the group consisting of alkali-swellable/soluble acrylic polymers, hydrophobically-modified alkali-swellable/soluble acrylic polymers, hydrophobically-modified ethoxylated urethane polymers, and combinations thereof.

12. The abrasive article of claim 10, wherein the organic polymeric rheology modifier is selected from the group consisting of alkali-swellable/soluble acrylic polymers.

13. The abrasive article of claim 10, wherein the amount of the at least partially cured resole phenolic resin comprises 99.35 to 99.9 weight percent of the combined weight of the at least partially cured resole phenolic resin and the organic polymeric rheology modifier.

14. The abrasive article of claim 10, wherein the abrasive particles comprise shaped abrasive particles.

15. The abrasive article of claim 14, wherein the shaped abrasive particles comprise precisely-shaped abrasive particles.

16. The abrasive article of claim 10, wherein the abrasive article is a coated abrasive article.

17. The abrasive article of claim 10, wherein the abrasive article is a nonwoven abrasive article.

18. The abrasive article of claim 10, wherein the substrate comprises a fiber scrim.

* * * * *